United States Patent [19]

Liesch et al.

[11] 4,434,368

[45] Feb. 28, 1984

[54] METHOD OF MEASURING THE REDUCING POWER OF GASES OVER THE CHARGE IN A BLAST FURNACE

[75] Inventors: Jean Liesch, Esch; Nico Reiff, Luxembourg; Vlasta Reimen, Esch; Romain Schmit, Esch; Arthur Schummer, Esch; Jo Simon, Esch; Paul Tonteling, Esch, all of Luxembourg

[73] Assignee: ARBED, S.A., Luxembourg, Luxembourg

[21] Appl. No.: 333,260

[22] Filed: Dec. 22, 1981

[30] Foreign Application Priority Data

Dec. 24, 1980 [LU] Luxembourg ............ 83 035

[51] Int. Cl.$^3$ ............................................. C21B 7/24
[52] U.S. Cl. .................................... 250/339; 250/342; 73/23; 75/42; 266/100
[58] Field of Search ...................... 266/80, 99, 78, 100; 75/41, 42; 250/281, 282, 357.1, 339, 342; 73/23

[56] References Cited

U.S. PATENT DOCUMENTS

| | | | |
|---|---|---|---|
| 3,588,067 | 6/1971 | Shimotsuma et al. | 250/357.1 |
| 4,110,617 | 8/1978 | Legille | 250/357.1 |
| 4,315,771 | 2/1982 | Bobillon | 75/41 |
| 4,332,374 | 6/1982 | Kremer | 266/99 |
| 4,345,746 | 8/1982 | Schleimer et al. | 266/78 |

OTHER PUBLICATIONS

Korobko et al. *Meas. Tech* U.S.A. vol. 19, No. 8, pp. 1213-1217, Aug. 1976, Jan. 1977.

*Primary Examiner*—M. J. Andrews
*Attorney, Agent, or Firm*—Karl F. Ross

[57] ABSTRACT

The reducing power of gases liberated at the top of the charge of an industrial furnace is determined by a method wherein the energy radiated from the charge in the range, for example between 1 and 6 microns, covering the radiant energy emitted by the compounds $CO_2$, $CO$, $H_2$, and $CH_4$ is continuously measured in a multiplicity of detection points distributed over the entire upper surface of the charge and outputs are formed corresponding to the energy radiated at each of the points. An energy image of the energy radiated at the points in the range is formed from the outputs. This energy image is converted into respective specific images for the compounds by isolating from the energy image for each detection point the radiant energy emitted by the compounds. The concentration of each of the compounds at each of the points is calculated from the intensity of the respective specific image. Finally the reducing power at each of the detection points is derived from the respective concentrations of the compounds thereat.

3 Claims, 2 Drawing Figures

METHOD OF MEASURING THE REDUCING POWER OF GASES OVER THE CHARGE IN A BLAST FURNACE

FIELD OF THE INVENTION

The present invention relates to a method of locally determining the reducing power of gases in an industrial furnace. More particularly this invention concerns the measurement of this reducing power over the top surface of the charge in a blast furnace.

BACKGROUND OF THE INVENTION

A blast furnace functions optimally when the charge drops in a uniform manner and when the consumption of fuel is reduced to a minimum. These two conditions are a function on one hand of the distribution of reducing gases through the charge and on the other hand of the optimal exploitation of their reducing power.

In order to be able to maximize the exploitation of the reducing power of the gases, it is necessary to known at all times the chemical makeup of the gaseous phase which is immediately above the charge. Thus for instance knowing the fact that CO is being liberated mainly at the center of the top of the charge means something significant to the person skilled in the art which will lead him to intervene by changing the distribution of the materials in the furnace, according to their degree of reducibility, in the region of the top of the charge. For instance material (e.g. ore) to be reduced would be concentrated in a location where the reducing power was considerable, as where considerable $H_2$, CO, and $CH_4$ and relatively little $CO_2$ was being liberated.

It is known to determine the chemical profile of the gaseous phase on top of the charge by using mobile probes to extract samples of the gas whose makeup is determined by an appropriate analysis technique. There are in effect special probes conceived to sweep as intensely as possible the area above the top of the charge. Thus these probes are exposed to high temperatures as well as to mechanical stresses. The described analysis procedure takes place in steps, so that the number of samplings, which is as high as usefully possible, determines the accuracy of the result obtained.

Considerable progress have been made toward increasing the speed and the number of detection points by a process which provides for measuring the infrared radiation and thereby determining the thermal profile at the top of the charge and for correlating the temperature measured at a given location with the composition of the gases at this location. This is done with the aid of standard calibration graphs, for example by a method similar to that which has been described above. In any case this infrared analysis technique is only an indirect method in the present context and the correlation between the readings taken and the information wanted is not unequivocal, so much that the results obtained by this procedure are not reliable enough to permit the metallurgist to intervene effectively.

OBJECTS OF THE INVENTION

It is therefore an object of the present invention to provide an improved blast-furnace gas-reducing power analysis method.

Another object is the provision of such a blast-furnace gas-reducing power analysis method which overcomes the above-given disadvantages.

Yet another object is to provide an improved method of operating a blast furnace so as to maximize its reducing efficiency.

SUMMARY OF THE INVENTION

These objects are attained according to the instant invention in a method of determining the reducing power of gases liberated at the top of the charge of an industrial furnace wherein the energy radiated from the charge in the range, for example between 1 and 6 microns, covering the radiant energy emitted by the compounds $CO_2$, CO, $H_2$, and $CH_4$ is continuously measured in a multiplicity of detection points distributed over the entire upper surface of the charge and outputs are formed corresponding to the energy radiated at each of the points. An energy image of the energy radiated at the points in the range is formed from the outputs. This energy image is converted into respective specific images for the compounds by isolating from the energy image for each detection point the radiant energy emitted by the compounds. The concentration of each of the compounds at each of the points is calculated from the intensity of the respective specific image. Finally the reducing power at each of the detection points is derived from the respective concentrations of the compounds thereat.

The idea on which the present invention is based consists in exploiting the possibilities offered by the analysis technique of measuring the intensity of the emitted radiant energy by different chemical compounds, a technique well known in itself. This technique is combined with the technique of forming images, in this case energy images which, converted into numerical images, makes available to the metallurgist the results of significant readings which can be translated into the desired parameters. It is above all the fact of being able to acquire the desired results either as profiles or as distributions, which makes the process according to the invention interesting.

According to another feature of this invention the energy image is converted into the specific image by eliminating, i.e. by filtering, from it at each detection point the radiation specific to a given one, e.g. $CO_2$, of the compounds. This step yields an energy image which shows the distribution of the intensity of the radiation of all of the compounds present, other than $CO_2$. Even though such an image only has a secondary interest, it is important for the techniques of standardization which are indispensable in determining the residual or base energy as well as the interelemental or intermolecular effects. It is also possible to convert the energy image into the specific image by eliminating from it at each detection point all radiation except the radiation specific to the respective compound. Thus the radiation whose origin is only the base, that is the mass of the charge, is eliminated at each detection point and only the radiation whose origin is a given compound, e.g. that of $CO_2$, is retained.

In order to carry out the first and/or the second above-described method according to the invention recourse is had to various known techniques for correcting the measured values.

It should be pointed out that the method of the invention establishes calibration curves that correlate on one side the measured energy intensities and on the other side temperatures and that these correlations are corrected for each compound with respect to the other compounds present and of the solid base constituted by the charge that emits radiation. Obviously, for example, $CO_2$ is an oxidizing agent, so that its concentration relative to the reducing agents CO, $H_2$, and $CH_4$ *is important.*

It is equally important to determine and to keep track of perturbing influences caused by dust and variations in the measured intensity caused by the variation in the height of the top of the charge. As, for example, the amount of dust increases, the readings must be reinterpreted to compensate for the lost radiation.

Thus in general the instant invention relates to a method of operating a blast furnace wherein a hot charge has an upper surface and wherein material is deposited on this surface to replenish the charge. The improvement basically consists of determining the reducing power of gases rising from the upper surface at a plurality of detection points distributed over the upper surface, and distributing the materials on the detection points of the upper surface in a manner corresponding to the determined reducing power so as to render uniform the reducing power of the gases rising from the upper surface. Thus if, for example, a particular spot on the surface of the charge is found to be liberating an above-average amount of reducing gases so that the reducing power at this location is substantially above average, extra material to be reduced, e.g. ore, or material to be reduced of a finer granularity is put on this spot to exploit this reducing power.

The apparatus for carrying out the process according to the invention basically comprises a radiation-energy detection unit provided either with a multiplicity of individual sensors or with a monodetector system with optical-mechanical sweeping. This unit is protected by an isolation gate and is mounted on the outside of the wall of the top of the furnace so as to scan the entire area of the top of the charge. Between the unit and the gate there is a module which has specific energy filters for the elimination of the spectral regions of $CO_2$, CO, $H_2$, and $CH_4$. The detection unit is connected to a unit for treating picked-up signals which also record the reading coming to it from the devices for measuring the geometric level of the charge, of the emmissivity of the charge, of the temperature of the charge, and of the degree of emission of powders. The sensor according to this invention further is provided with filters for eliminating from the radiant energy sensed radiant energy not specific to the compounds.

Thus the measurement of the geometric level or height above the ground of the charge can be made by a standard device for determining the level in a closed container, such as the one described by applicant in Luxembourg patent application 82,830. The emissivity can be read by some unit for measuring the energy intensity, as for example by a unit like the main unit or computer-type controller that is part of the installation according to the invention.

It is obvious that the emissivity of the charge itself is on a region of the spectrum different from that of the radiation of the gases. The sensed spectrum band or region should be sufficiently large to include the spectral regions associated with the various materials in the furnace.

To measure temperature a pyrometer with a sweeping head is preferably used, which equally is a standard instrument and the emission of powders will be monitored with the aid of an appropriate nephelometer or a simple video camera.

The main control unit for treating signals is obviously a computer provided with the programs necessary for carrying out the different conversions and the calculations of the individual local concentrations in specific gases and for providing on a display screen comprehensive images showing the distribution of any one of the gaseous components above the area of the charge, or the distribution of the reducing power.

DESCRIPTION OF THE DRAWING

The above and other features and advantages will become more readily apparent from the following, reference being made to the accompanying drawing in which.

SPECIFIC DESCRIPTION

Figure 1:
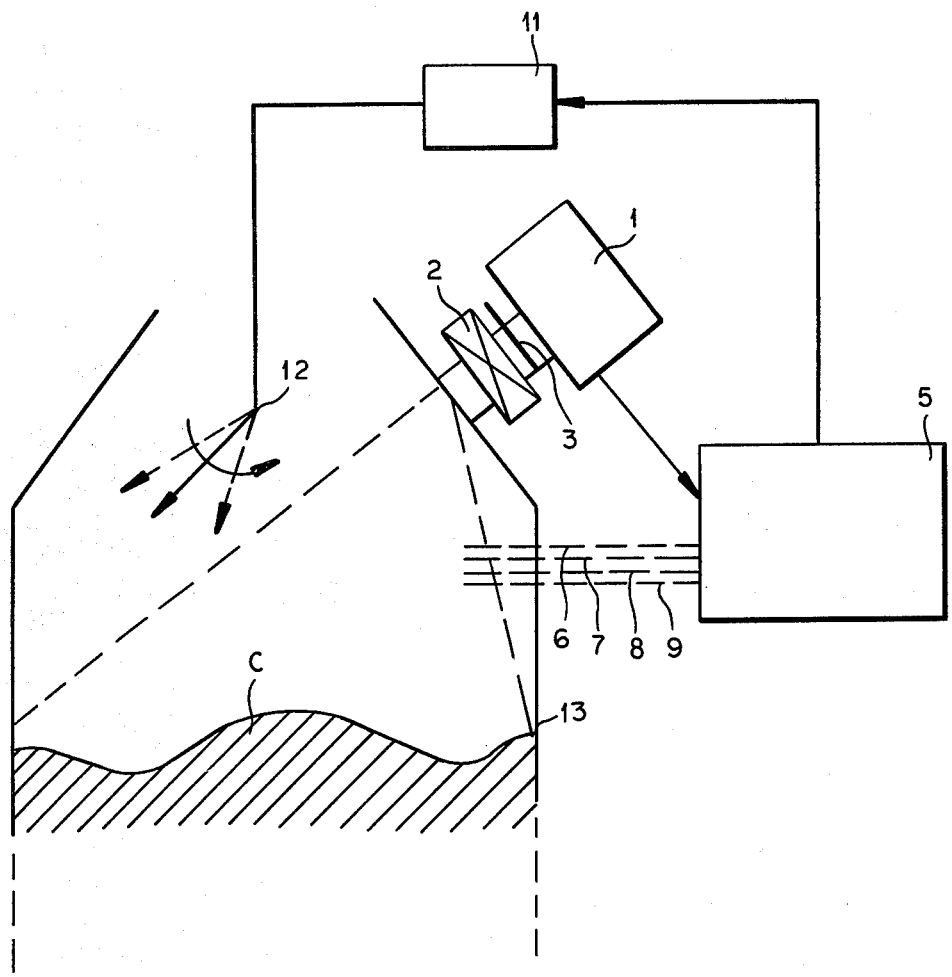
FIG. 1 is a largely diagrammatic system showing the apparatus for carrying out the method of this invention.
Figure 2:
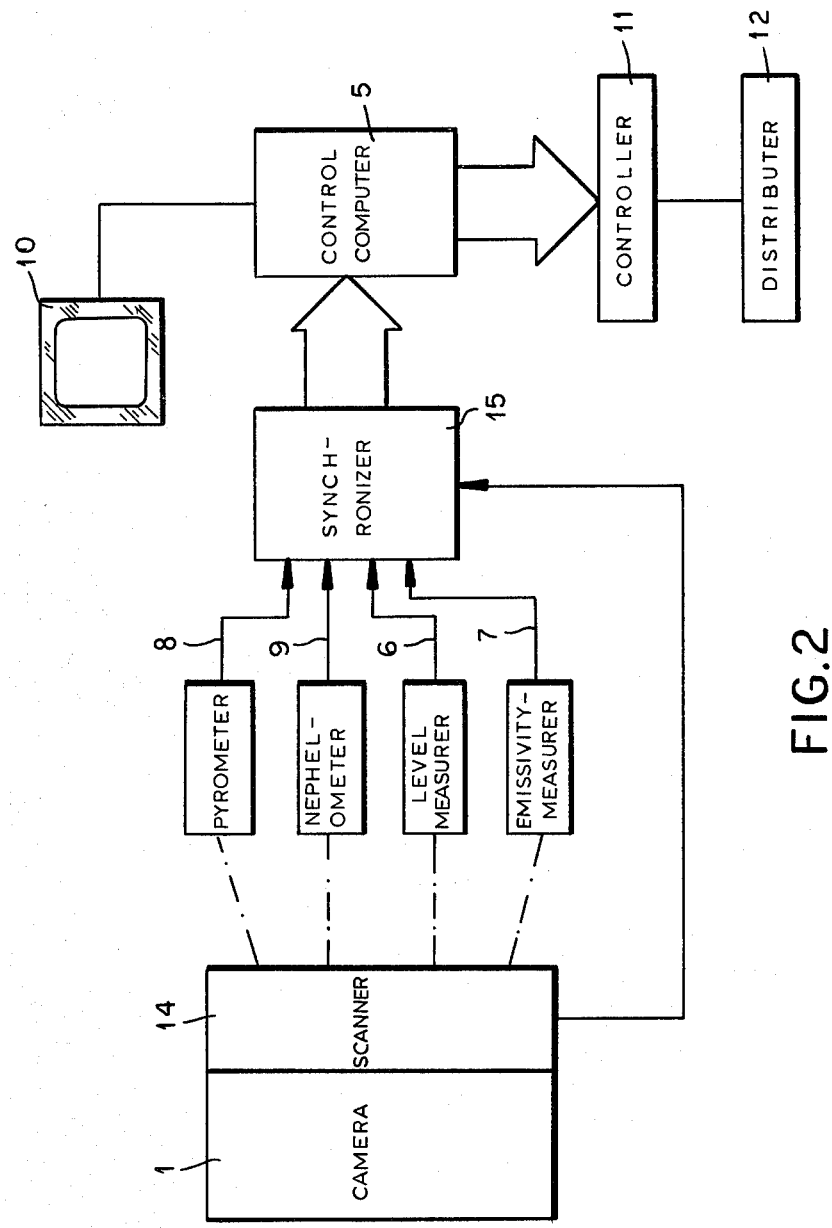
FIG. 2 is a schematic diagram of the apparatus of this invention.

A detection unit constituted as a camera 1 is shown which is fixed to the outside of the shell of a blast furnace 13 containing a charge C. The camera 1 is protected by an isolating gate 2. Between the gate 2 and the camera 1 there is a manual or automatic filter module 3 so that absorbing filters in the spectral region of $CO_2$, CO, $CH_4$, or $H_2$ can be interposed between camera 1 and charge C. Preferably narrow band-pass filters are used. A sweeping type monodetector scanner 14 (FIG. 2) is employed in the camera 1 so that the entire surface of the charge C is swept and scanned continuously.

The camera 1 is connected to computer 5 constituting a picked-up signal-treating unit which makes the different conversions and which receives to this end the signals coming from ancillary instruments for measuring and generating outputs corresponding to the level of the geometric profile 6 of the charge, its emissivity 7, its temperature 8, and its degree of emission of powders 9. The scanner 14 is connected to the computer 5 via a synchronizer 15 so that the various inputs 6–9 will be identified with the respective detection points on the charge surface.

The types of conversion, the correction calculations and the like are not absolute in that they depend from the outputs offered by the instrumentation used, as well as from working methods preferred by the analysts.

A display of video monitor 10 can show the overall energy image of the top of the charge, or an energy image specific to a particular gas or other parameter.

The invention also includes a control or regulating unit 11 is controlled by the central computer 5. This unit 11 is connected to a distribution installation 12 which can rotate or pivot about its vertical axis centered on the furnace 13 so that it is possible for the distributor 12 to spread the materials to be treated in the furnace at specific locations on top of the charge in such a manner that the reducing power of the gases emanating from the charge C is uniform over the entire upper surface of this charge C.

Thus the computer 5 can furnish the outputs necessary for preceeding with the aid of the distributor 12 with the judicious distribution of the materials according to their degree of reducibility and to contribute to good functioning of the furnace.

We claim:

1. A method of determining the reducing power of gases liberated at the top of the charge of an industrial furnace, said method comprising the steps of:

continuously scanning over a multiplicity of detection points distributed over the entire upper surface of said charge energy radiated in a wavelength range of 1 to 6 microns by excited molecules of the compounds $CO_2$, $CO$, $H_2$, and $CH_4$, and forming outputs corresponding to the energy radiated at each of said points by said compounds;

forming from said outputs an energy image of the energy radiated at said points in said range;

converting said energy image into respective specific images for said compounds by isolating from said energy image for each detection point a particular radiant energy emitted in said range by the respective compound;

calculating the concentration of each of said compounds at each of said points from the intensity of the respective specific image; and deriving the reducing power at each of said detection points from the respective concentrations of said compounds thereat.

2. The method defined in claim 1 wherein said energy image is converted into said specific image by eliminating from it at each detection point the radiation specific to each of said compounds.

3. The method defined in claim 1 wherein said energy image is converted into said specific image by eliminating from it at each detection point all radiation except the radiation specific to the respective compound.

* * * * *